United States Patent
De Freitas et al.

(10) Patent No.: US 11,667,375 B2
(45) Date of Patent: Jun. 6, 2023

(54) SYSTEM AND METHOD OF VTOL VEHICLE FLIGHT CONTROL INCEPTORS

(71) Applicant: EMBRAER S.A., São José dos Campos (BR)

(72) Inventors: Rafael Desideri De Freitas, São José dos Campos (BR); Yasser Mahmud Abdallah, São José dos Campos (BR)

(73) Assignee: Eve UAM, LLC, Wilmington, DE (US)

( * ) Notice: Subject to any disclaimer, the term of this patent is extended or adjusted under 35 U.S.C. 154(b) by 12 days.

(21) Appl. No.: 17/384,343

(22) Filed: Jul. 23, 2021

(65) Prior Publication Data

US 2022/0041267 A1 Feb. 10, 2022

Related U.S. Application Data

(60) Provisional application No. 63/062,741, filed on Aug. 7, 2020.

(51) Int. Cl.
*B64C 13/04* (2006.01)
*B64C 13/22* (2006.01)
*B64C 13/50* (2006.01)
*B64C 29/00* (2006.01)

(52) U.S. Cl.
CPC .......... *B64C 13/0421* (2018.01); *B64C 13/22* (2013.01); *B64C 13/503* (2013.01); *B64C 29/0033* (2013.01)

(58) Field of Classification Search
CPC ... B64C 13/0421; B64C 13/22; B64C 13/503; B64C 13/042; B64C 13/0423; B64C 29/0033
See application file for complete search history.

(56) References Cited

U.S. PATENT DOCUMENTS

| | | | | |
|---|---|---|---|---|
| 5,472,156 | A * | 12/1995 | Bivens, III | B64C 27/56 244/234 |
| 9,898,033 | B1 * | 2/2018 | Long | G01D 5/145 |
| 10,144,504 | B1 * | 12/2018 | Selwa | G05G 1/01 |
| 2009/0187292 | A1 * | 7/2009 | Hreha | B64C 13/0421 701/4 |
| 2013/0206900 | A1 * | 8/2013 | Yates | B64C 27/56 74/523 |
| 2017/0036753 | A1 * | 2/2017 | Shue | B64C 13/04 |
| 2019/0161170 | A1 * | 5/2019 | Taylor | B64C 13/12 |
| 2020/0216164 | A1 * | 7/2020 | Gibson | B64C 13/0421 |
| 2020/0333805 | A1 * | 10/2020 | English | B64C 13/0421 |
| 2020/0365050 | A1 * | 11/2020 | Antraygue | B64C 13/0421 |

\* cited by examiner

*Primary Examiner* — Rodney A Bonnette
(74) *Attorney, Agent, or Firm* — Nixon & Vanderhye P.C.

(57) ABSTRACT

A VTOL inceptor arrangement is handled by a single pilot and consists of or comprises a first inceptor and a second inceptor. The first inceptor is capable of controlling at least one axis of movement and the second inceptor is capable of controlling at least three axes of movement. The first inceptor is configured to be operated by a first hand of the pilot, and the second inceptor is configured to be operated by a second hand of the pilot different from the first hand. These two hand-operated inceptors enable use of reliable operation based on stick motion (i.e., the pilot's respective hands each grasp a respective inceptor) instead of relying on movement of switches, knobs or the like—which may not allow precision control under vibration or turbulent environments or conditions.

16 Claims, 4 Drawing Sheets

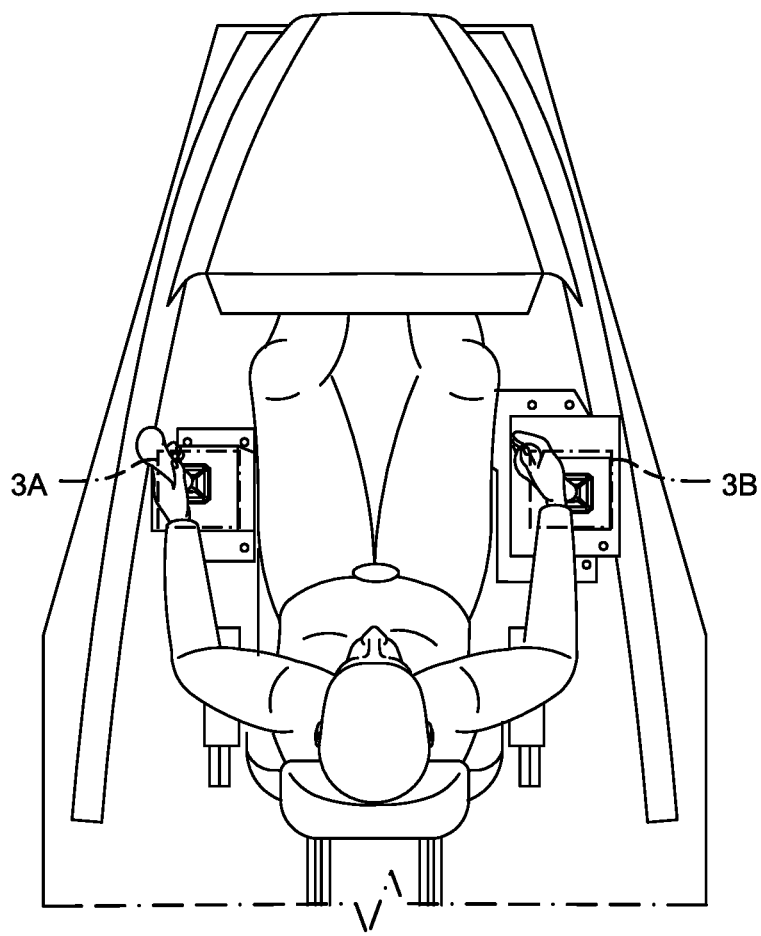
FIG. 3
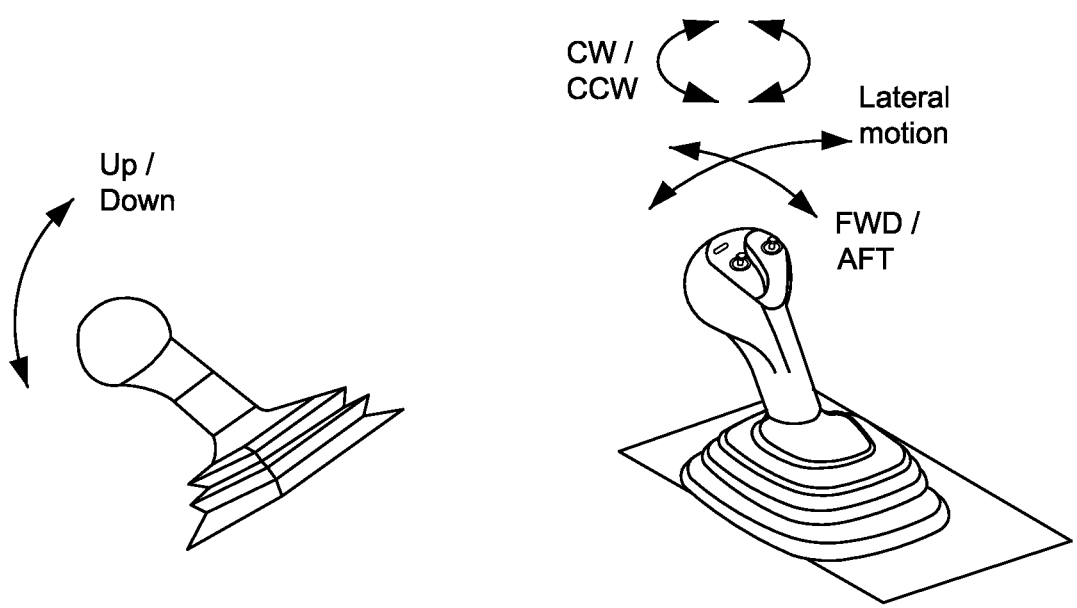
FIG. 3A  FIG. 3B

SYSTEM AND METHOD OF VTOL VEHICLE FLIGHT CONTROL INCEPTORS

CROSS-REFERENCE TO RELATED APPLICATIONS

The present application claims benefit of 63/062,741 filed Aug. 7, 2020, which is incorporated herein by reference in its entirety and for all purposes.

FIELD

The technology herein relates to vertical take-off and landing aircraft (VTOL). This technology has particular applicability for VTOL aircraft operation, but can be also applied for any type of aircraft or helicopter.

BACKGROUND

Urban air mobility (UAM) has the potential to radically reshape intra and intercity transportation.

There is a demand for Vertical takeoff and landing (VTOL) aircraft to serve passengers in an urban environment, based on the key design drivers of safety, passenger experience, affordability and a very low footprint for the community, in terms of noise and emissions. FIG. 1 shows an example VTOL aircraft 100 including eight elevation rotors 102 and two propulsion thrusters 104. Wings 108 provide lift when the VTOL 100 has sufficient forward velocity under power from thrusters 104. By controlling the various rotors, thrusters and control surfaces (e.g., rudder 106), this VTOL aircraft is capable of moving in 6 degrees of freedom (6DOF), i.e.:

Pitch
Roll
Yaw
Up/down
Left/right
Forward/backward.

Plural such motions are often combined (e.g., so that the VTOL is pitching upwards while it is moving forward).

Using such different motions, the VTOL can be controlled to operate in different phases of flight, for example:

Hover is characterized by the phase of vertical takeoff or landing (primarily based on use of elevation rotors 102);

Transition is characterized by a phase in which there is a forward vehicle movement, but airspeed is not enough for the wing alone to provide lift to the VTOL (where the elevation rotors 102 maintain altitude and the thrusters 104 provide forward thrust); and Cruise is characterized by a phase in which there is a forward vehicle movement and airspeed is enough for the wing alone to provide lift to the VTOL (in this phase, the wings 108 provide lift and the thrusters 104 provide forward thrust).

To improve VTOL efficiency, one key factor is vehicle weight. In order to reduce weight while increasing available space within the cockpit, one solution is to use inceptors more compact than those of the prior art. On modern fly-by-wire (FBW) vehicles, rudder pedals are less used than on previous versions with mechanical control, because the FBW is capable of automatically performing tasks such as a coordinated curve (controlled rotation about the longitudinal axis without transverse forces being felt) without the need for pedal demand. Therefore, there are advantages in using different configurations of inceptors in modern FBW control systems, especially in emerging UAM vehicles.

Other VTOL vehicles have proposed different techniques, but they are either complex or may present higher difficulty in controllability during turbulent atmospheric conditions. For example, some vehicles use a single sidestick able to control four (4) axes of movement, removing the need for a pedal, but one of the axes is controlled through a rotatable knob which may be difficult to adjust to provide precise control during vibration or turbulence.

Also, typical controls of aircraft or helicopters are generally not adapted for transition between different flight phases of a VTOL operation. Therefore, there are also advantages in having a different configuration of inceptors which allows the same sense of motion in all phases of flight while still keeping precise control.

BRIEF DESCRIPTION OF THE DRAWINGS

FIG. 3 shows a further example VTOL vehicle cockpit including an inceptor arrangement comprising a first inceptor 3A and a second inceptor 3B.

FIG. 3A shows an example configuration for the first inceptor 3A.

FIG. 3B shows an example configuration for the second inceptor 3B.

DETAILED DESCRIPTION OF EXAMPLE NON-LIMITING EMBODIMENTS

The technology herein provides systems and methods according to which a vertical takeoff and landing (VTOL) aircraft is controlled by an inceptor arrangement without the need for rudder pedals.

Such inceptor arrangement can be handled by a single pilot (see FIGS. 2 and 3) and consists of or comprises two differently configured inceptors: a first inceptor and a second inceptor. The first inceptor is capable of controlling at least one axis of movement (hereafter called as "1 axis inceptor") and the second inceptor is capable of controlling at least three axes of movement (hereafter called as "3 axis inceptor"). The first inceptor is configured to be operated by a first hand of the pilot, and the second inceptor is configured to be operated by a second hand of the pilot different from the first hand. These two hand-operated inceptors each enable use of reliable operation based on stick motion (i.e., the pilot's respective hands each grasp a respective inceptor) instead of relying on movement of switches, knobs or the like—which may not allow precision control under vibration or turbulent environments or conditions.

Figure 1:
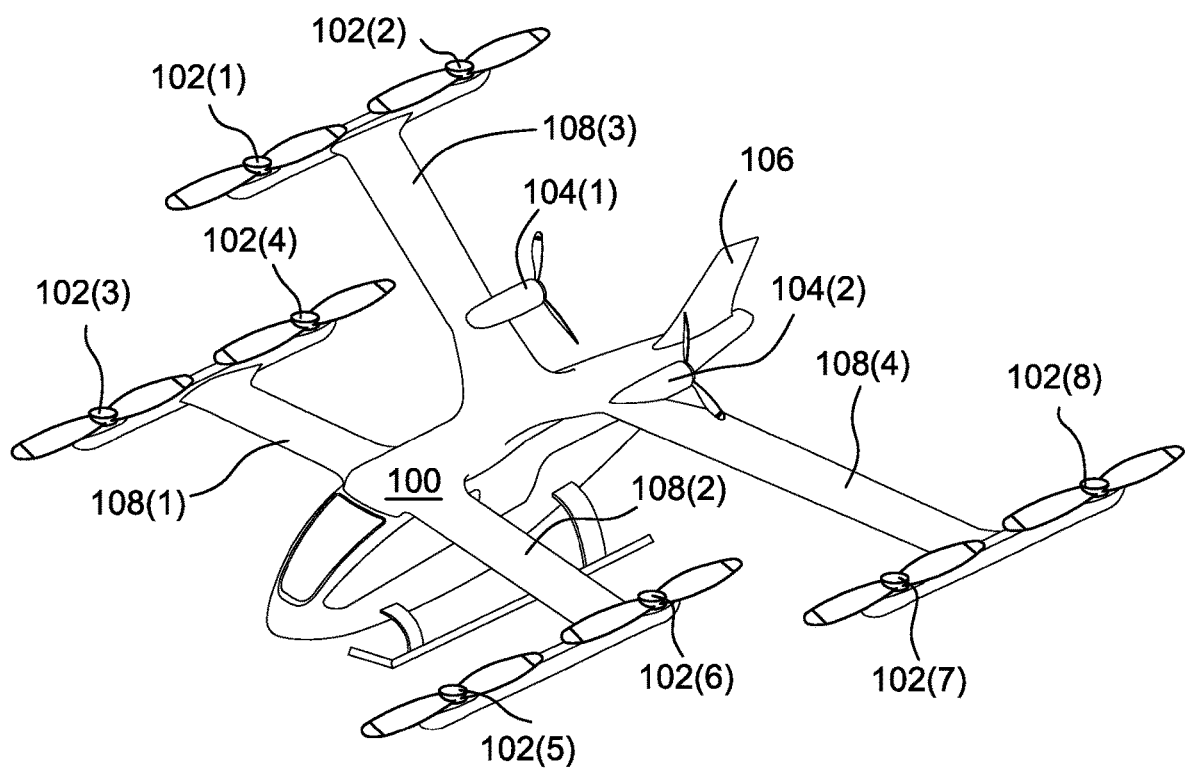
FIG. 1 shows an example VTOL aircraft.
Figure 2:
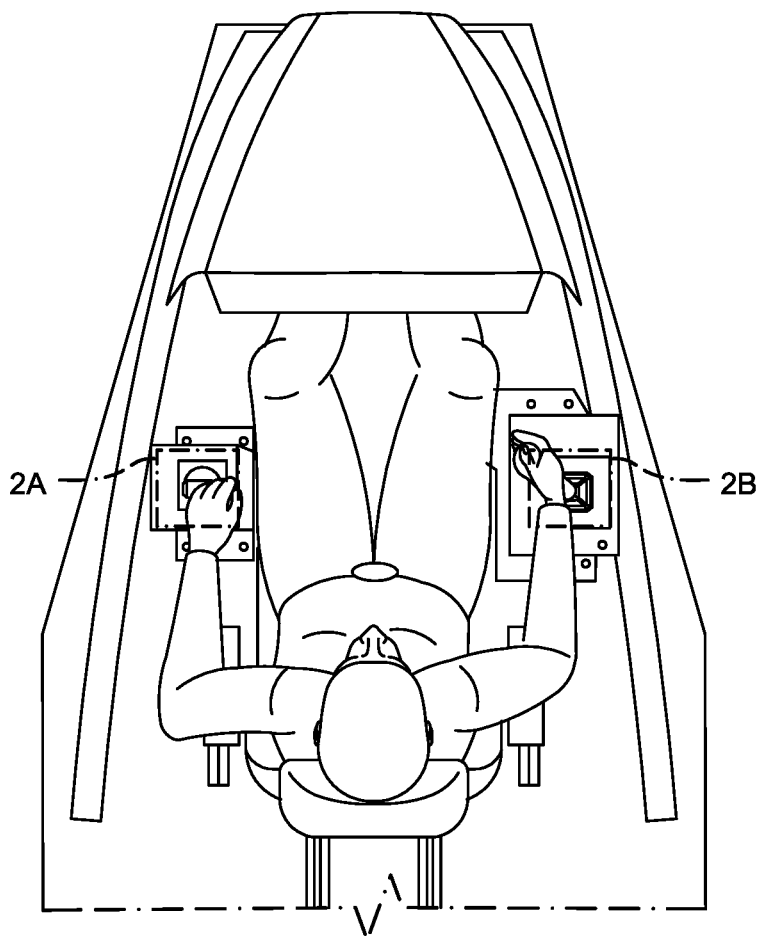
FIG. 2 shows an example VTOL vehicle cockpit including an inceptor arrangement comprising a first inceptor 2A and a second inceptor 2B.
Figure 2A:
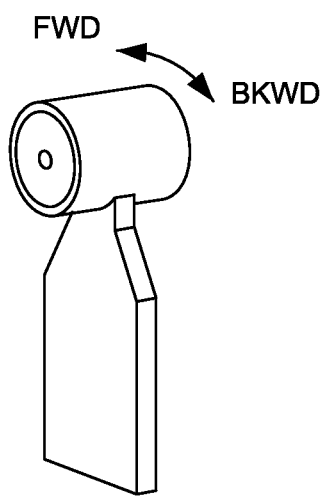
FIG. 2A shows an example configuration for the first inceptor 2A.
Figure 2B:
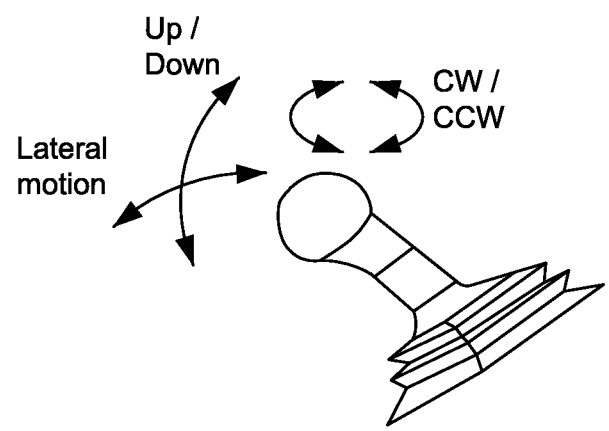
FIG. 2B shows an example configuration for a second inceptor 2B.

The VTOL system and method using such inceptors comprises the following non-limiting embodiments:

Non-limiting embodiment 1 shown in FIGS. 2, 2A and 2B: according to this embodiment, the "1 axis inceptor" 2A is used to control forward/backward vehicle movement; and the "3 axes inceptor" 2B is used to provide the following vehicle controls:

a) lateral vehicle movement and roll by applying command to the lateral axis of the "3 axes inceptor";

b) up/down vehicle movement by applying command to the pitch axis of the "3 axes inceptor";

c) vehicle yaw (clockwise or counterclockwise) movement through the twist of the grip of the "3 axes inceptor".

In some embodiments, the inceptors 2A and 2B can be interchanged with respect to the pilot's left and right hands depending on whether the pilot is left-handed or right-handed.

Non-limiting embodiment 2 shown in FIGS. 3, 3A and 3B: according to this embodiment, the "1 axis inceptor" 3A is used to control up/down vehicle movement; and the "3 axes inceptor" 3B is used to provide the following vehicle controls:

a) lateral vehicle movement and roll by applying command to the lateral axis of the "3 axes inceptor":

b) forward backward movement by applying command to the pitch axis of the "3 axes inceptor"; and c) vehicle yaw (clockwise or counterclockwise) movement through the twist of the grip of the "3 axes inceptor".

Thus, in one configuration a reduced-function inceptor is used to control only one of up/down and forward/backward movement of the VTOL aircraft, and another, increased-function inceptor is used to control the other one of up/down and forward/backward movement of the VTOL aircraft as well as other types of movement of the VTOL aircraft. There are advantages to the pilot in terms of the simplicity of having one hand control up/down or forward/backward movement and the other hand control all or most other aspects of movement. Furthermore, in some embodiments, the type of control to a particular axis of movement (e.g., up/down or forward/backward) is changed or customized based on the phase of flight of the VTOL aircraft.

A challenge in terms of controllability of VTOL vehicles is related to possible different vehicle responses to the inceptor commands in the different flight phases, such as hover, transition and cruise, among possible other phases of flight. The systems and methods herein avoid a different sense of motion in these different flight phases.

As discussed above:

Hover is characterized by the phase of vertical takeoff or landing;

Transition is characterized by a phase in which there is a forward vehicle movement, but airspeed is not enough for the wing alone to provide lift to the VTOL;

Cruise is characterized by a phase in which there is a forward vehicle movement and airspeed is enough for the wing alone to provide lift to the VTOL; and Other flight phases may exist, such as climb and descent, and are considered a combination of the above phases.

To avoid different sense(s) of motion in these different flight phases, the system and method of control of embodiments herein use at least one processor or computer coupled to the inceptors to control (i) rotors 102 and/or thrusters 104 and/or (iii) control surface 106 and 108 actuators for the vehicle to keep the same sense of motion for all flight phases.

To provide the same sense(s) of motion during all flight phases, based on the controls demanded on the inceptors, example non-limiting embodiments provide:

the increasing or decreasing of lift of one or more rotors 102; and/or the changing of the amount of thrust of one or more thrusters 104; and/or movement of flight control surfaces 106 and 108.

Figure 4:
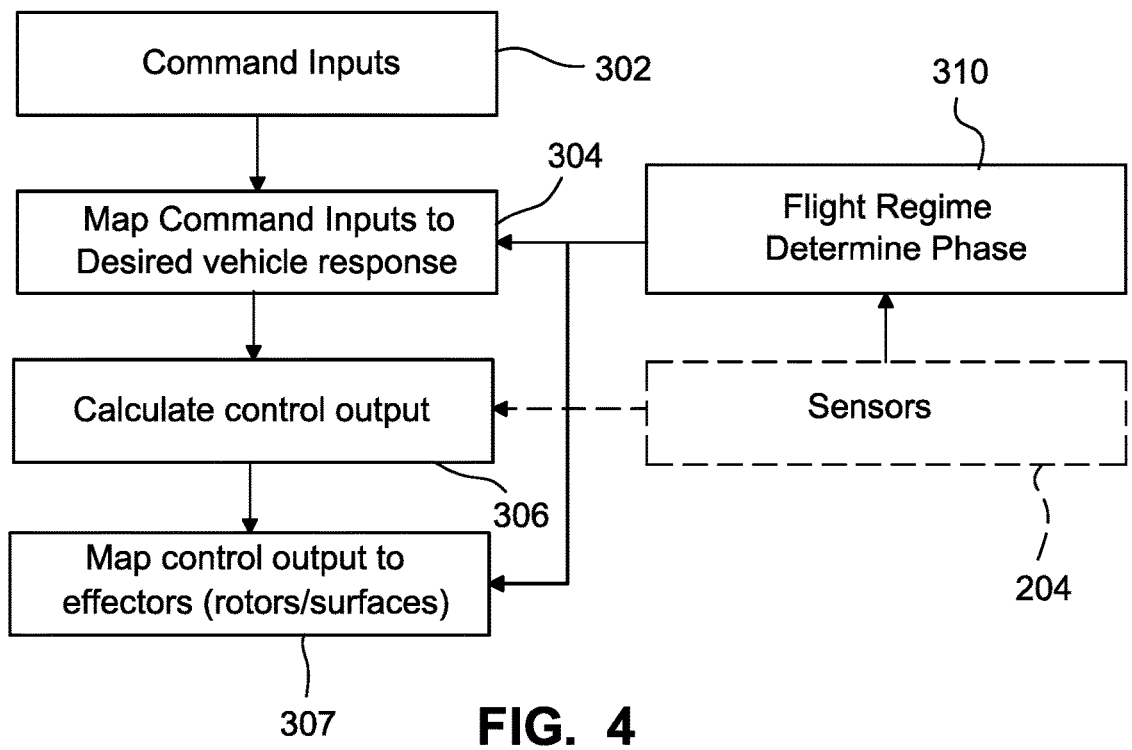
FIG. 4 is a flowchart of example program control steps performed by the flight control computer shown in FIG. 5.
Figure 5:
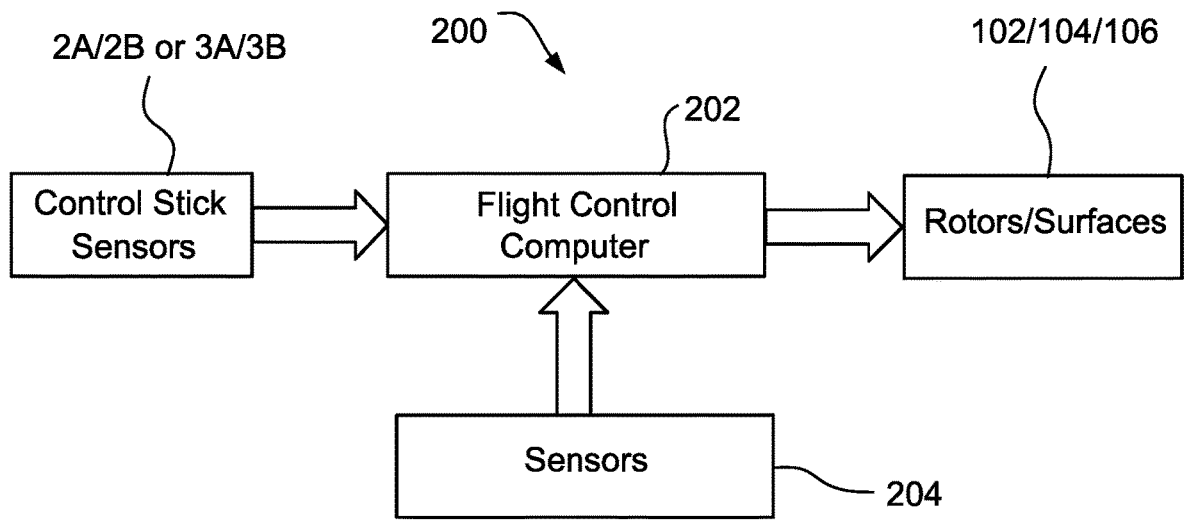
FIG. 5 shows an example system block diagram.

FIG. 5 shows an example schematic block diagram of a VTOL FBW system 200 including a flight control computer 202 that receives input signals from inceptors 2A/2B or 4A/4B and sensors 204, and provides control outputs to control rotors 102, thrusters 104 and control surfaces 106. FIG. 4 shows example program control steps performed by flight control computer 202 executing instructions stored in non-transient memory. These example program control steps receive command inputs 302 from inceptors 2A/2B or 3A/3B, and map those command inputs into desired vehicle response (block 304). Such mapping can involve lookup tables, control laws and/or other dynamic algorithms, and can take into account the current phase of flight of the VTOL such that the mapping is different depending on the current phase of flight (see block 310). Phase of flight, may be determined by voting sensors 204 such as Air Data, Inertial, GPS, and possibly others also, but not necessarily all of them, as well as current control state indicators. In case some sensors are invalid or not available, the remaining ones will be used to provide fault tolerance. The computer calculates control outputs (block 306) and maps the control outputs to control effectors such as control surface 106 actuators and the motors or engines that provide rotational energy to rotors 102 and thrusters 104 (block 307). The transformation of inceptor inputs to outputs to the effectors (actuators, rotors, thrusters, tilting mechanisms, etc) is based on the phase of flight and a predetermined control allocation programmed into the computer.

Main Elements of Example Embodiments

1. A flight control system and method comprising one inceptor capable of controlling at least one axis, and another inceptor capable of controlling at least three axes of movement, and at least one processor coupled to the inceptors.

2. The flight control system and method of the above wherein the 1 axis inceptor is used to control forward/backward vehicle movement; and the 3 axes inceptor is used to provide the following vehicle controls: a) lateral movement and roll; b) up/down movement; and c) vehicle yaw (clockwise or counterclockwise) movement.

3. The flight control system and method of the above wherein alternatively the 1 axis inceptor is used to control up/down vehicle movement; and the 3 axes inceptor is used to provide the following vehicle controls: a) lateral movement and roll; b) forward/backward movement; c) vehicle yaw (clockwise or counterclockwise) movement.

4. The system and method of the above wherein the processor implements a control law that adapts to each specific flight phase to avoid different sense(s) of motion in these different flight phases as follows:

4.1) For the system and method of one embodiment, while in hover, the 1 axis inceptor controls forward/backward vehicle speed either proportionally to the inceptor deflection or using a gain shaper to adjust for optimal controllability. While in transition or cruise, it controls vehicle forward/backward acceleration. The 3 axes inceptor is used to provide the following vehicle controls:

a) while in hover, a lateral movement on the inceptor controls vehicle lateral speed either proportionally to the inceptor deflection or using a gain shaper to adjust for optimal controllability. While in cruise, it controls the roll rate, and it uses a lateral directional control law to perform coordinated curves while there is no demand in the yaw axis of the inceptor and a curve with sideslip when there is yaw axis demand. While in transition, it blends from a pure lateral speed demand to a coordinated curve demand or a curve with sideslip.

b) While in hover, an aft deflection of the 3 axis inceptor controls rate of increase of height and a forward deflection controls rate of decrease of height. While in cruise, it controls flight path change rate. While in transition, it blends from height rate to flight path change rate.

c) While in hover, the twist of the grip of the 3 axis inceptor controls vehicle yaw (clockwise or counterclockwise) rate. While in cruise, it controls vehicle sideslip. While in transition, it blends from yaw rate to sideslip.

4.2) For the system and method of another embodiment, while in hover, the 1 axis inceptor controls rate of change of height. While in cruise, it controls flight path change rate. While in transition, it blends from height rate to flight path change rate. The 3 axes inceptor is used to provide the following vehicle controls:

a) while in hover, a lateral movement on the inceptor controls vehicle lateral speed either proportionally to the inceptor deflection or using a gain shaper to adjust for optimal controllability. While in cruise, it controls the roll rate, and it uses a lateral directional control law to perform coordinated curves while there is no demand in the yaw axis of the inceptor and a curve with sideslip when there is yaw axis demand. While in transition, it blends from a pure lateral speed demand to a coordinated curve demand or a curve with sideslip.

b) While in hover, an aft/forward deflection of the 3 axis inceptor controls forward/backward vehicle speed either proportionally to the inceptor deflection or using a gain shaper to adjust for optimal controllability. While in transition or cruise, it controls vehicle forward/backward acceleration.

c) While in hover, the twist of the grip of the 3 axis inceptor controls vehicle yaw (clockwise or counterclockwise) rate. While in cruise, it controls vehicle sideslip. While in transition, it blends from yaw rate to sideslip.

5. The flight control system and method of the above wherein the processor provides the same sense(s) of motion during all flight phases based on the controls demanded on the inceptors, and also on any other sensors necessary to compute vehicle state, by determining:

the increasing or decreasing of the thrust of one or more rotors; and/or the changing of the thrust direction of one or more rotors; and/or movement of flight control surfaces 6. The system and method of the above further including a switch that switches control from the flight control inceptors to another means of control, such as an autonomous flight system, backup means of control or a remote station, and vice-versa.

While the invention has been described in connection with what is presently considered to be the most practical and preferred embodiments, it is to be understood that the invention is not to be limited to the disclosed embodiments. For example, while the inceptors 2A and 2B are of different electromechanical configurations/form factors and the inceptors 3A, 3B are of different electromechanical configurations/form factors in some embodiments, in other embodiments the left-hand and right-hand inceptors could have the same electromechanical configuration and/or form factor but provide outputs that the computer interprets differently depending on whether the inceptor is designated as a left-hand inceptor or a right-hand inceptor. The invention is thus intended to cover various modifications and equivalent arrangements included within the spirit and scope of the appended claims.

The invention claimed is:

1. A flight control system comprising:
a first inceptor configured to control a single degree of freedom of movement of a VTOL aircraft,
a second inceptor configured to control at least three additional degrees of freedom of movement of the VTOL aircraft, and
at least one processor coupled to the inceptors, the at least one processor being configured to change a type of control by the first inceptor and/or second inceptor to at least one of the degrees of freedom of movement of the VTOL aircraft based on phase of flight of the VTOL aircraft, for controlling the VTOL aircraft without need for pedals.

2. The flight control system of claim 1 wherein the first inceptor is configured and connected to control forward/backward movement of the VTOL aircraft; and the second inceptor is configured and connected to control the following movements of the VTOL aircraft:
a) lateral movement and roll;
b) up/down movement; and
c) vehicle yaw (clockwise or counterclockwise) movement.

3. The flight control system of claim 1 wherein the first axis inceptor is configured and connected to control up/down movement of the VTOL aircraft; and the second inceptor is configured and connected to control the following movements of the VTOL aircraft:
a) lateral movement and roll;
b) forward/backward movement; and
c) vehicle yaw (clockwise or counterclockwise) movement.

4. The flight control system of claim 1 wherein the processor implements at least one control law that adapts to each specific flight phase to avoid different sense(s) of motion in these different flight phases as follows:
while the VTOL aircraft is in hover, the first inceptor controls forward/backward VTOL aircraft speed either proportionally to the inceptor deflection or using a gain shaper to adjust for optimal controllability; and
while the VTOL aircraft is in transition or cruise, the first inceptor controls VTOL aircraft forward/backward acceleration;
while the VTOL aircraft is in hover, a lateral movement on the second inceptor controls VTOL aircraft lateral speed either proportionally to the inceptor deflection or using a gain shaper to adjust for optimal controllability; and
while in cruise, the second inceptor controls roll rate, and uses a lateral directional control law to perform coordinated curves while there is no demand in the yaw axis of the inceptor and a curve with sideslip when there is yaw axis demand;
while in transition, the second inceptor blends from a pure lateral speed demand to a coordinated curve demand or a curve with sideslip;
while the VTOL aircraft is in hover, an aft deflection of the second inceptor controls rate of increase of height and a forward deflection controls rate of decrease of height;
while the VTOL aircraft is in cruise, the second inceptor controls flight path change rate;

while the VTOL aircraft is in transition, the second inceptor blends from height rate to flight path change rate;

while the VTOL aircraft is in hover, a twist of a grip of the second inceptor controls VTOL aircraft yaw (clockwise or counterclockwise) rate;

while in cruise, a twist of the grip of the second inceptor controls VTOL aircraft sideslip; and while the VTOL aircraft is in transition, the second inceptor blends from yaw rate to sideslip.

5. The flight control system of claim 1 wherein the processor implements at least one control law that adapts to each specific flight phase to avoid different sense(s) of motion in these different flight phases as follows:

while a VTOL aircraft is in hover, the first inceptor controls rate of change of height;

while a VTOL aircraft is in cruise, the first inceptor controls flight path change rate;

while the VTOL aircraft is in transition, the first inceptor blends from height rate to flight path change rate;

the second inceptor is used to provide the following VTOL aircraft controls:

while the VTOL aircraft is in hover, a lateral movement on the second inceptor controls VTOL aircraft lateral speed either proportionally to the inceptor deflection or using a gain shaper to adjust for optimal controllability;

while the VTOL aircraft is in cruise, the second inceptor controls roll rate, and the processor uses a lateral directional control law to perform coordinated curves while there is no demand in the yaw axis of the second inceptor and a curve with sideslip when there is yaw axis demand;

while in transition, the second inceptor blends from a pure lateral speed demand to a coordinated curve demand or a curve with sideslip;

while the VTOL aircraft is in hover, an aft/forward deflection of the second inceptor controls forward/backward VTOL aircraft speed either proportionally to the inceptor deflection or using a gain shaper to adjust for optimal controllability;

while the VTOL aircraft is in transition or cruise, the second inceptor controls VTOL aircraft forward/backward acceleration;

while the VTOL aircraft is in hover, a twist of a grip of the second inceptor controls VTOL aircraft yaw (clockwise or counterclockwise) rate;

while the VTOL aircraft is in cruise, the second inceptor controls VTOL aircraft sideslip; and while the VTOL aircraft is in transition, the second inceptor blends from yaw rate to sideslip.

6. The flight control system of claim 1 wherein the processor is configured to provide the same sense(s) of motion during all flight phases based on the controls demanded on the inceptors, and also on any other sensors necessary to compute VTOL aircraft state, by determining:

the increasing or decreasing of the thrust of one or more rotors; and/or the changing of the thrust direction of one or more rotors; and/or movement of flight control surfaces.

7. The flight control system of claim 1 further including a switch that switches control from the first and second inceptors to another means of control.

8. The flight control system of claim 7 wherein the other means of control comprises an autonomous flight system, a backup means of control or a remote station.

9. A flight control method for controlling a VTOL aircraft without the need for pedals, comprising:

using a first inceptor configured to control a single degree of freedom of movement of the VTOL aircraft, using a second inceptor to control at least three additional degrees of freedom of movement of the VTOL aircraft, and using at least one processor coupled to the inceptors to change a type of control by the first inceptor and/or second inceptor to at least one of the degrees of freedom of movement of the VTOL aircraft based on phase of flight of the VTOL aircraft.

10. The flight control method of claim 9 wherein further including using the first inceptor to control forward/backward movement of the VTOL aircraft;

and using the second inceptor to control the following movements of the VTOL aircraft:

a) lateral movement and roll;

b) up/down movement; and c) vehicle yaw (clockwise or counterclockwise) movement.

11. The flight control method claim 9 further including using the first axis inceptor to control up/down movement of the VTOL aircraft; and using the second inceptor to control the following movements of the VTOL aircraft:

a) lateral movement and roll;

b) forward/backward movement; and c) vehicle yaw (clockwise or counterclockwise) movement.

12. The flight control method of claim 9 further including the processor implementing at least one control law that adapts to each specific flight phase to avoid different sense(s) of motion in these different flight phases as follows:

while the VTOL aircraft is in hover, the first inceptor controlling forward/backward VTOL aircraft speed either proportionally to the inceptor deflection or using a gain shaper to adjust for optimal controllability; and while the VTOL aircraft is in transition or cruise, the first inceptor controlling VTOL aircraft forward/backward acceleration;

while the VTOL aircraft is in hover, a lateral movement on the second inceptor controlling VTOL aircraft lateral speed either proportionally to the inceptor deflection or using a gain shaper to adjust for optimal controllability; and while in cruise, the second inceptor controlling roll rate, and using a lateral directional control law to perform coordinated curves while there is no demand in the yaw axis of the inceptor and a curve with sideslip when there is yaw axis demand;

while in transition, the second inceptor blending from a pure lateral speed demand to a coordinated curve demand or a curve with sideslip;

while the VTOL aircraft is in hover, an aft deflection of the second inceptor controlling rate of increase of height and a forward deflection controls rate of decrease of height;

while the VTOL aircraft is in cruise, the second inceptor controlling flight path change rate;

while the VTOL aircraft is in transition, the second inceptor blending from height rate to flight path change rate;

while the VTOL aircraft is in hover, a twist of a grip of the second inceptor controlling VTOL aircraft yaw (clockwise or counterclockwise) rate;

while in cruise, a twist of the grip of the second inceptor controlling VTOL aircraft sideslip; and while the VTOL aircraft is in transition, the second inceptor blending from yaw rate to sideslip.

13. The flight control method of claim 9 further including the processor implementing at least one control law that adapts to each specific flight phase to avoid different sense(s) of motion in these different flight phases as follows:
  while a VTOL aircraft is in hover, the first axis inceptor controlling rate of change of height;
  while a VTOL aircraft is in cruise, the first inceptor controlling flight path change rate;
  while the VTOL aircraft is in transition, the first inceptor blending from height rate to flight path change rate;
  using the 3 axes inceptor to provide the following VTOL aircraft controls:
  while the VTOL aircraft is in hover, a lateral movement on the second inceptor controlling VTOL aircraft lateral speed either proportionally to the inceptor deflection or using a gain shaper to adjust for optimal controllability;
  while the VTOL aircraft is in cruise, the second inceptor controlling roll rate, and the processor uses a lateral directional control law to perform coordinated curves while there is no demand in the yaw axis of the inceptor and a curve with sideslip when there is yaw axis demand;
  while in transition, the second inceptor blending from a pure lateral speed demand to a coordinated curve demand or a curve with sideslip;
  while the VTOL aircraft is in hover, an aft/forward deflection of the second inceptor controlling forward/backward VTOL aircraft speed either proportionally to the inceptor deflection or using a gain shaper to adjust for optimal controllability;
  while the VTOL aircraft is in transition or cruise, the second inceptor controlling VTOL aircraft forward/backward acceleration;
  while the VTOL aircraft is in hover, a twist of a grip of the second axis inceptor controlling VTOL aircraft yaw (clockwise or counterclockwise) rate;
  while the VTOL aircraft is in cruise, the second inceptor controlling VTOL aircraft sideslip; and
  while the VTOL aircraft is in transition, the second inceptor blending from yaw rate to sideslip.

14. The flight control method of claim 9 further including using the processor to provide the same sense(s) of motion during all flight phases based on the controls demanded on the inceptors, and also on any other sensors necessary to compute VTOL aircraft state, by determining:
  the increasing or decreasing of the thrust of one or more rotors; and/or
  the changing of the thrust direction of one or more rotors; and/or
  movement of flight control surfaces.

15. The flight control method of claim 9 further including switching control from the first and second inceptors to another means of control.

16. The flight control method of claim 15 wherein the other means of control comprises an autonomous flight system, a backup means of control or a remote station.

* * * * *